P. B. STUART.
Grapples for Hoisting Monuments.
No. 151,061. Patented May 19, 1874.
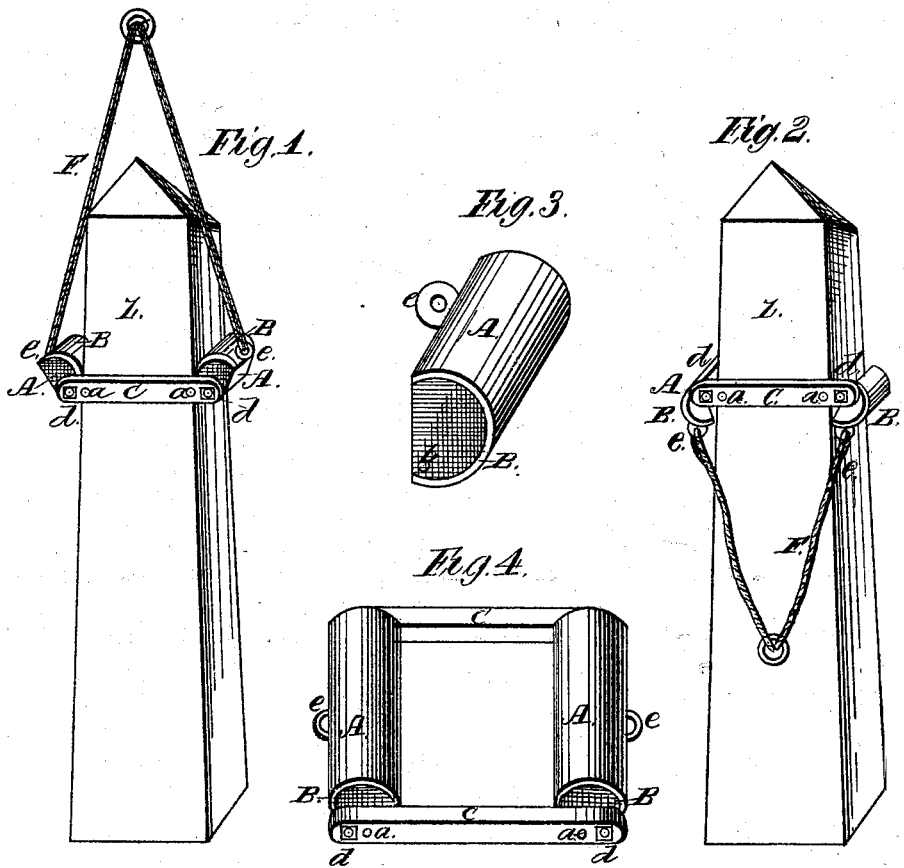
Attest:
William Pettingell
Charles H. Pettingell
Inventor:
Peleg B. Stuart

UNITED STATES PATENT OFFICE.

PELEG B. STUART, OF PAINESVILLE, OHIO.

IMPROVEMENT IN GRAPPLES FOR HOISTING MONUMENTS.

Specification forming part of Letters Patent No. 151,061, dated May 19, 1874; application filed April 9, 1874.

*To all whom it may concern:*

Be it known that I, PELEG B. STUART, of Painesville, in the county of Lake and State of Ohio, have invented certain Improvements in Devices used in Raising Monuments, &c., of which the following is a specification:

The invention consists in a combination of devices, which will be clearly described, and pointed out in the claim, the object thereof being to provide a device for griping monuments while hoisting them, without fraying the edges or polished surfaces thereof.

Figure 1 shows the invention applied to the object in the act of raising it. Fig. 2 shows the invention as placed on the object preparatory to using it; Fig. 3, enlarged view of cam-roller, showing its construction; Fig. 4, view of the frame complete.

A A are rollers, covered at B (shown at Fig. 3) with india-rubber, or some other elastic substance. Said rollers are secured to the ends of the stretchers C by the bolts $d$, which pass through the holes $a$ in each end of said stretchers, and through the holes $b$, which pass through the length of the cam-rollers A, and below their centers, thus forming cams of said rollers. When the stretchers C and cam-rollers A are secured together a square frame is formed, as shown at Fig. 4. Said frame is secured to the object to be lifted, such as a shaft for a monument, as shown at $z$, Figs. 1 and 2, by passing it down over the shaft until low enough to gripe round said object; then the rollers are revolved together by the lifting action of the rope F, which is secured to said cam-rollers by the loops $e$, said loops being secured to the flattened sides of the rollers. When the power is applied to the rope the cams revolve inward, and by the said pressure the cams gripe the object, securely holding the same when raised from the ground, the elastic coating on the cams presenting a soft surface to the object, thus preventing marring, and giving it a more secure gripe.

What I claim as my invention, and desire to secure by Letters Patent, is—

The combination of the stretchers $c$, with their holes $a\ a$, cam-rollers A, coated with an elastic substance, B, loops $e$, and rope F, substantially as and for the purpose as hereinbefore set forth.

PELEG B. STUART.

Witnesses:
WILLIAM PETTINGELL,
CHARLES H. PETTINGELL.